United States Patent

Sisbarro et al.

[11] Patent Number: 5,846,835
[45] Date of Patent: Dec. 8, 1998

[54] MANUFACTURING METHOD FOR LAMINATED IMMUNODIAGNOSTIC TEST DEVICE

[75] Inventors: Fredrick P. Sisbarro, Wayne; Glenn W. Thomsen, Cream Ridge; Albert R. Nazareth, Mercerville, all of N.J.

[73] Assignee: Carter Wallace, Inc., New York, N.Y.

[21] Appl. No.: 906,638

[22] Filed: Aug. 7, 1997

Related U.S. Application Data

[63] Continuation of Ser. No. 434,342, May 2, 1995, abandoned.

[51] Int. Cl.$^6$ ............................................. G01N 33/48
[52] U.S. Cl. ............................ 436/166; 156/264; 156/324
[58] Field of Search ................................ 156/264, 267, 156/329; 436/44, 166

[56] References Cited

U.S. PATENT DOCUMENTS

| D. 361,842 | 8/1995 | Nazareth et al. | D24/225 |
|---|---|---|---|
| D. 369,868 | 5/1996 | Nazareth et al. | D24/225 |
| 4,235,601 | 11/1980 | Deutsch et al. . | |
| 4,420,353 | 12/1983 | Levine | 156/324 |
| 4,435,504 | 3/1984 | Zuk et al. | 435/7 |
| 4,459,358 | 7/1984 | Berke | 436/170 |
| 4,545,843 | 10/1985 | Bray | 156/324 |
| 4,806,311 | 2/1989 | Greenquist | 422/56 |
| 4,868,108 | 9/1989 | Bahar et al. | 435/7 |
| 4,891,313 | 1/1990 | Berger et al. | 436/7 |
| 4,954,319 | 9/1990 | Koizumi et al. | 422/67 |
| 5,075,078 | 12/1991 | Osikowicz et al. | 422/56 |
| 5,096,836 | 3/1992 | Macho et al. | 436/169 |
| 5,160,486 | 11/1992 | Schlipfenbacher et al. | 422/56 |
| 5,238,847 | 8/1993 | Steinbiss et al. | 436/64 |
| 5,403,706 | 4/1995 | Wilk et al. | 435/4 |

FOREIGN PATENT DOCUMENTS

| 0 284 232 A1 | 9/1988 | European Pat. Off. | 33/558 |
|---|---|---|---|
| 0 420 021 A2 | 4/1991 | European Pat. Off. . | |
| 0 420 021 A3 | 4/1991 | European Pat. Off. . | |
| 43 14 493 A | 10/1994 | Germany . | |
| 2204398 B | 11/1988 | United Kingdom | 33/532 |
| WO94/001775 | 1/1994 | WIPO . | |
| WO94/15215 | 7/1994 | WIPO . | |

OTHER PUBLICATIONS

Grant et al.,Chemical Dictionary, ISNB 0–07–024067–1, p. 464, col. 1, "polyvinyl alcohol".

*Primary Examiner*—Lyle A. Alexander
*Attorney, Agent, or Firm*—Testa, Hurwitz & Thibeault, LLP

[57] ABSTRACT

The invention relates to a method of making a laminated substrate for use in an immunodiagnostic device and a machine or apparatus for marking the substrate with reagent. The method of forming the laminated substrate creates a rollable chromatographic medium. The chromatographic medium can be biphasic or multiphasic. The biphasic chromatographic medium comprises a capture medium precast onto a plastic backing and a release medium. The release and capture media are bonded to a liner material such as a plastic film. The multiphasic chromatographic medium comprises a capture medium precast onto a plastic backing, a release medium, and a sample absorbent medium. The capture medium, the release medium and the sample absorbent medium are disposed on a liner material such as a plastic film. The biphasic and multiphasic laminates are prepared for use as immunoassays by a specially adapted machine or apparatus. The machine includes a leader, an unwind system, a reagent dispensing system, a substrate reject marking system, a drying system, and a rewind system. In one exemplary embodiment, the machine applies four reagents to the substrate. The particular reagents used in the machine will vary depending upon the immunoassay to be performed.

8 Claims, 4 Drawing Sheets

FIG. 7

MANUFACTURING METHOD FOR LAMINATED IMMUNODIAGNOSTIC TEST DEVICE

This is a continuation of application Ser. No. 08/434.342 filed on May 2, 1995 now abandoned.

BACKGROUND OF THE INVENTION

The invention relates generally to the field of immunodiagnostic testing and the process of preparing a biphasic and a multiphasic laminated substrate for use in the testing device. More particularly, the invention relates to an apparatus for applying reagents to the biphasic and multiphasic laminated substrates to adapt them for use as immunodiagnostic devices.

Laminated substrates used in immunodiagnostic devices or as immunoassays are well known in the art. Prior art laminated substrates comprise a nitrocellulose membrane precoated onto a plastic film to form the laminate. Other materials, such as an absorbent release medium, added to the substrate are not lined by the polymeric backing material. The resulting substrates often lack structural rigidity.

When preparing the prior art substrates for use in an immunodiagnostic device, the reagents are applied manually. That is, the reagents to be used in the assay are applied to the substrate by hand, resulting in a more costly and time consuming manufacturing process. The present invention overcomes many of the limitations of the prior art.

SUMMARY OF INVENTION

This invention relates to a laminated substrate for use in immunodiagnostic devices and an apparatus for preparing the substrate with reagent. The laminated substrate comprises chromatographic media laminated onto a backing material. The chromatographic medium can be biphasic or multiphasic. The term "biphasic" as used herein denotes a substrate having two distinct phases. That is, each phase is comprised of physically distinct materials such as paper and a polymeric material. The term "multiphasic" denotes a substrate having three or more distinct phases.

In one embodiment, the laminate comprises a biphasic chromatographic layer. The chromatographic layer includes a capture medium precast onto a plastic backing and a release medium. Both the release and capture media are disposed on a liner material such as a plastic film. The process of forming the biphasic laminate includes overlapping an edge of the release medium over an edge of the capture medium. Of course, it is possible to form the laminate such that an edge of the capture medium slightly overlaps an edge of the release medium. The overlapping arrangement of the release and capture media forms a single release/capture media layer such that a single liquid flow path is formed therein. The release/capture media layer is then adhesively bonded to the liner material, forming the biphasic laminated substrate.

The process of bonding the release/capture media layer to the liner requires placing the liner material in vertical, parallel alignment with the release/capture media layer. The liner material and the release/capture media layers advance coincidentally through a laminating machine which presses or laminates the liner and capture/release media layers together. The adhesive is applied either to the liner material or to the back side of the release/capture media layer. The adhesive can be applied to the liner or the release/capture media layer during the process of forming the laminated substrate. It is possible also to order the liner from a commercial vendor with the adhesive precast onto it. The laminated substrate formed by this process then may be rolled on a spindle and stored for later use.

In an exemplary embodiment of the biphasic laminated substrate, an absorbent paper is used as the release medium and a nitrocellulose material is used as the capture medium. The nitrocellulose material is precoated or laminated onto a polymeric backing sheet such as polyethylene terephthalate (PET). The nitrocellulose layer and the release medium are laminated onto a liner material, thereby forming the laminated substrate. The liner material may be a plastic film such as PET.

In another embodiment the multiphasic laminated substrate includes a sample absorbent medium, a capture medium, a release medium, and a liner material. In forming the multiphasic laminated substrate, an edge of the sample absorbent medium slightly overlaps an edge of the capture medium. An opposite edge of the capture medium is slightly overlapped by an edge of the release medium. This structural arrangement of the release, capture, and sample absorbent media layers forms a single multimedia layer which has a single liquid flow path therein. It is possible, however, to form a liquid flow path through these media by varying the arrangement of the layers such that an edge of the capture medium overlaps an edge of the sample absorbent medium and an opposite edge of the capture medium overlaps an edge of the release medium. Any arrangement which permits a liquid sample to flow from the upstream or proximal end of the substrate downstream to the distal end can be used.

The process of forming the multiphasic laminated substrate requires placing the liner material in vertical, parallel alignment with the multimedia layer. The liner material and the multimedia layer advance simultaneously through a laminating machine. The laminating machine creates an adhesive bond in the substrate which laminates the liner material and the multimedia layer together. The adhesive may be applied to the backside of the multimedia layer or to the liner material.

In an exemplary embodiment of the multiphasic laminated substrate, the multiphasic laminate is formed using an absorbent paper as the release medium, a nitrocellulose material as the capture medium, an absorbent material as the sample absorbent, and a plastic film or sheet such as PET as the liner material. The laminated substrates, both multiphasic and biphasic, are generally capable of withstanding a tension of greater than 25 pounds-force.

Once the laminated substrate (biphasic or multiphasic) is formed, reagents used to carry out the diagnostic assay are applied to it. A unique apparatus or machine is used to apply the reagents to the laminated substrate. The machine includes a leader, an unwind system, a reagent dispensing system, a substrate reject marking system, a drying system, and a rewind system.

The leader is a paper material spliced to the end of the laminated substrate. Other materials having sufficient tensile strength may be used as the leader. The leader is threaded through the machine beginning at the unwind system and ending at the rewind system. In operation, upon activating the unwind and the rewind systems, the leader and the substrate advance simultaneously through the machine. The leader and substrate advance through a plurality of rollers placed in predetermined locations throughout the machine to maintain the substrate in proper alignment.

To begin the process of marking the substrate, the unwind system unrolls the substrate from the unwind spindle. The unwind system includes one or more unwind spindles, one or more feed control loops, one or more tension control mechanisms, one or more guides, a splice table, at least one or more unwind accumulators, one or more static elimination bars, and various sensors.

The unwind spindles are mounted on the machine in spatial disposition. The unwind spindle mounting permits an operator to perform on the fly splicing of the substrate at the splice table without stopping the machine. The unwind system can include a drive system such as a motor for supplying power to the unwind spindles.

The feed control loops facilitate substrate advancement through the machine. The tension control mechanisms monitor and maintain proper tension on the substrate as it advances through the feed control loops. The unwind system guides are placed strategically throughout the machine for maintaining the substrate in proper alignment. The static elimination bars remove electrostatic charge from the substrate, and the unwind system accumulators temporarily store the substrate as it is unwound from the unwind spindles.

The various sensors included in the unwind system comprise one or more sensors for detecting if the unwind accumulator is full or empty. If the sensors detect that the accumulator is full or empty, they cause the machine to stop or an adjustment of the unwind spindle speed. The unwind system also includes a sensor which detects if the substrate level at the unwind spindle is low. If the sensor detects a low substrate level, it causes the activation of an operator warning system. The machine also includes a sensor for detecting if the unwind spindles are empty. If the sensor detects that the unwind spindles are empty, the machine is stopped. After the substrate passes through the unwind system, it advances through the dispensing system.

The reagent dispensing system continually applies reagent to the substrate. The reagent dispensing system comprises a plurality of reagent reservoirs, a plurality of reagent dispensing nozzles, and a plurality of reagent dispensing pump systems. The reagent reservoirs separately store the reagent which is to be applied to the substrate. The reservoirs are housed in a refrigerated chamber, and in one embodiment, the chamber maintains a temperature of approximately 4° C. One of skill in the art will appreciate that it is possible to construct the machine such that the refrigeration chamber is separate from the reagent dispensing system.

Each reagent dispensing nozzle is separately connected to an independent reservoir. The reagent dispensing nozzles each apply a predetermined amount of reagent to the substrate. The reagent dispensing pump systems include one or more piston pumps which are independently connected to a single reservoir and dispensing nozzle.

The fluid line connecting a reservoir to its respective pump system contains one or more sensors which monitor the reagent solution for bubbles. The presence of bubbles in the reagent solution may be detrimental to the application process. Thus, if the sensors detect bubbles in the solution, they cause the machine to shut down or the activation of an operator warning system. As each pump system, reservoir, and dispensing nozzle combination are independently operable, the machine may be operated with less than all reservoir and pump systems being activated.

In one exemplary embodiment, the machine applies four reagents to the substrate. The reagents applied to the substrate include (1) a goat antimouse IgG solution, comprising a water based buffer solution with a density and a viscosity near that of water; (2) a streptavidin solution, comprising a water based buffer solution with a density and viscosity near that of water; (3) a biotin solution, comprising approximately 28% Maltrin, and 1% Tris buffer; and (4) a gold solution, comprising approximately 40% Maltrin, 5% bovine serum albumin ("BSA") and 0.7% Tris buffer. The reagent dispensing system magnetically stirs the gold solution so that little or no vortex is formed therein. Of course, one of skill in the art will appreciate that other reagent solutions may be applied to the substrate. The particular reagents used will depend upon the immunodiagnostic test to be produced. The reagent marked substrate is monitored by the reject marking system to determine the substrate's suitability for use in an immunoassay.

The substrate reject marking system monitors the reagent markings to determine their continuity. If the substrate reject marking sensors detect that the reagent markings are unacceptable because of a lack of continuity, the reject marking system applies reject markings to the substrate. These reject markings alert a user to discard the identified substrate sections.

The sensors used to monitor the continuity of the reject markings preferably comprise a vision system. The vision system also may be used to monitor the substrate for noncontinuous substrate sections caused by splicing the substrate together. One of skill in the art will appreciate that a transmission or reflection sensor system or a linear scanner may be used to accomplish the functions of the vision system.

In addition to the described sensors, the reject marking system includes a reservoir for holding the reject marking solution and a reject marking dispensing system for applying the reject marking solution to the substrate. The reject marking dispensing system includes a pump connected to the reservoir and a dispensing nozzle which applies the marking solution to the substrate. The substrate reject marking solution comprises, but is not limited to, a mixture of red and blue food coloring, Proclin 300, and water. The reagent marked substrate, along with any reject markings, is dried by the drying system.

The drying system includes a drying chamber, a fan, and a filter. The fan blows heated air onto the substrate in a direction opposite to the travel of the substrate. The filter removes contaminants from the air before the fan blows it onto the substrate. The drying system includes one or more sensors for monitoring drying system air flow and air temperature. The sensors cause the machine to shut down or the activation of an operator warning system if they detect air flow and temperature parameters outside a predetermined range. After the reagent marked substrate exits the drying chamber, it is either temporarily stored in a rewind accumulator or advanced to the rewind system.

The rewind system includes one or more rewind spindles placed in spatial disposition, one or more guides, one or more tension controls, one or more accumulators, and various sensors. The rewind spindles are mounted on the machine in a manner which permits on the fly spindle change without stopping the machine. The feed controls guide the substrate onto the rewind spindles, and the tension controls monitor and control the tension of the substrate as it advances onto the rewind spindles. The rewind accumulator servers as a temporary storage unit for the rewind system, storing the substrate until it can be advanced to an active rewind spindle.

The various sensors included in the rewind system comprise one or more sensors for detecting if the rewind spindles are full or empty. If the sensors detect that the rewind spindles are full, an operator warning system is activated or the machine is stopped. The machine also includes one or more sensors for detecting whether the rewind accumulators are empty or full. The sensors cause the machine to stop or an adjustment of the rewind speed or the activation of an operator warning if sensors receive a reading of full or empty. The rewind system also includes one or more sensors for measuring and reporting substrate roll length and diameter at the rewind spindles.

In addition to the features previously described, the substrate marking machine includes sensors for monitoring and providing statistical process control data concerning machine operating parameters. The sensors cause the activation of an operator warning system if an identified operating parameter tends toward a predefined control limit. The sensors also cause the machine to shut down if an operating parameter actually crosses a predefined control limit.

The machine displays sensor outputs, showing real time values for the parameter history, including target and control limits. The display means may be a computer, liquid crystal display, a light emitting device, or other similar types of display devices. The machine also includes a system for recording sensor outputs. The recording system may be a printer, a memory storage means, or other similar devices.

The machine includes one or more operator control panels which include a substrate speed control, a dryer temperature control, a reagent dispensing rate control, a pump rate control, a pump filling control, and a total pump displacement control. Each operator control is independently connected to a respective operator control panel.

The machine also includes one or more automated control systems which include a system for controlling substrate jog, machine run, dispense tip vertical displacement, dispense rate, pump rate, and pump direction. Each system is independently connected to a respective automated control system such as a computer which monitors each of the recited systems. The computer receives input from the sensors and uses this sensor data to control machine functions.

It is an object of this invention to provide a flexible laminated biphasic or multiphasic substrate, wherein the entire substrate is laminated onto a polymeric liner material.

It is another object of this invention to provide a rollable laminated biphasic or multiphasic substrate.

It is a further object of this invention to provide a machine which applies reagent to the biphasic or multiphasic laminated substrate, adapting the substrate for use as an immunodiagnostic device.

The foregoing and other objectives, aspects, features, and advantages of the invention will become more apparent from the following description of the drawings, the detailed description, and the claims.

DETAILED DESCRIPTION

The invention relates to a laminated substrate for use in an immunoassay and the process of making it. The invention also relates to a process and apparatus for adapting the substrate for use as an immunodiagnostic device. The substrate comprises a chromatographic medium which can be either biphasic or multiphasic.

Applicants incorporate by reference the co-pending application of Nazareth et al. for an Improved Diagnostic Detection Device and Method filed on May 2, 1995, Ser. No. 08/432,894. The Nazareth et al. application sets forth in detail the materials used to form the biphasic and multiphasic laminated substrates and the resulting immunodiagnostic device.

The biphasic laminated substrate includes a treated release medium and a capture medium. The release medium comprises a bibulous, hydrophilic material, such as absorbent paper. Preferred materials for use as a release medium include cotton linter paper such as S&S 903 and S&S GBOO2 (available from Schleicher and Schuell, Inc., Keene, N. H.), and cellulosic materials such as Ahlstrom 939 made of cellulose polyamide and Ahlstrom 1281 made of cellulose and rayon with polyamide (available from Ahlstrom Inc.).

The release medium preferably is coated with an aqueous solution containing BSA and nonionic surfactant, such as Tritron X-100 (available from Rohm & Haas Co., Philadelphia, Pa.) in order to prevent nonspecific binding and to facilitate release of the diffusible reagents. A combination of about 3% BSA and about 0.1% Triton X-100 is useful for this purpose.

The primary function of the release medium is to hold, release, and transport various immunological components of the assay, such as a labeled binding member and a capturable component, both of which have specific affinity for an analyte of interest. This release and transport occurs during routine operation of the assay.

The capture medium comprises a hydrophilic polymeric material, preferably a nitrocellulose or nylon membrane. The preferred materials for use as the capture medium are microporous polymeric films such as nitrocellulose, nylon 66, a combination of the two, or various other materials of similar nature which are known by those skilled in the art. Membranes of nitrocellulose, nylon 66, or similar materials having a pore size in the range from about 5 $\mu$ to about 20 $\mu$ are most preferred.

The primary function of the capture medium is to immobilize the non-diffusible reagents used to detect the presence of the analyte in the test. Protein reagents can be immobilized on the capture medium by adsorption, without the need for chemical or physical modifications. The nitrocellulose membrane may comprise nitrocellulose alone or in combination with an ester of nitric acid and/or other acids.

In an exemplary embodiment, the nitrocellulose membrane is laminated or coated onto a clear polymer film such as PET. Commercially available polymer films such as those available under the trade name Mylar™ are useful for this purpose (Mylar™ is a trademark of DuPont DeNemours Company). The nitrocellulose membrane may be fabricated by art-recognized techniques, including direct casting of the nitrocellulose polymer onto a Mylar™ sheet, or by laminating a nitrocellulose film with a Mylar™ sheet. Prelaminated or precast nitrocellulose sheets useful in the present invention are commercially available, for example, from Millipore Corporation located in Bedford, Mass.

As described herein, the release and capture media are joined together to form a single liquid flow path. Reagents for detecting, labeling, and capturing the analyte of interest are disposed on the release and capture media. Located on the release medium is a binding member reactive with a first epitope of the analyte of interest. The binding member is labeled with a detectable marker such as a colloidal gold conjugate. A capturable component is located on the release medium downstream of the binding member, which component comprises a binding agent reactive with a second epitope of the analyte and one member of an affinity pair.

When the laminated substrate is a multiphasic medium, the substrate includes a release medium, a capture medium precast onto a PET backing, a sample absorbent medium, and a liner. The release, capture, and liner media comprise the materials previously described in the discussion above for the biphasic substrate. These materials perform the same function as that described for the biphasic laminate. The added component, the sample absorbent, is an absorbent paper of the type described as forming the release medium for the biphasic laminated substrate.

The multiphasic laminated substrate is formed by overlapping an edge of the release medium over an edge of the capture medium. The sample absorbent medium slightly overlaps an opposite edge of the capture medium. This structural formation creates a single multimedia layer having a single flow path therein.

In practice, when using either the biphasic or the multiphasic laminated substrates, the diffusible and non-diffusible reagents can be applied to the release and capture media by any well-known techniques. In an exemplary embodiment of the invention, a unique apparatus (machine) applies reagent to the substrate in narrow bands.

The machine includes a leader, an unwind system, a reagent dispensing system, a substrate reject marking system, and a rewind system. The leader advances the substrate through the machine. The unwind system unrolls the substrate from a storage spindle and facilitates its advancement through the machine. The reagent dispensing system applies various reagents to the substrate. The substrate reject marking system monitors the substrate for defects and marks unacceptable sections of the substrate for rejection. The reagent marked substrate is dried in a drying chamber, and the rewind system re-rolls it onto a storage spindle.

Figure 1:
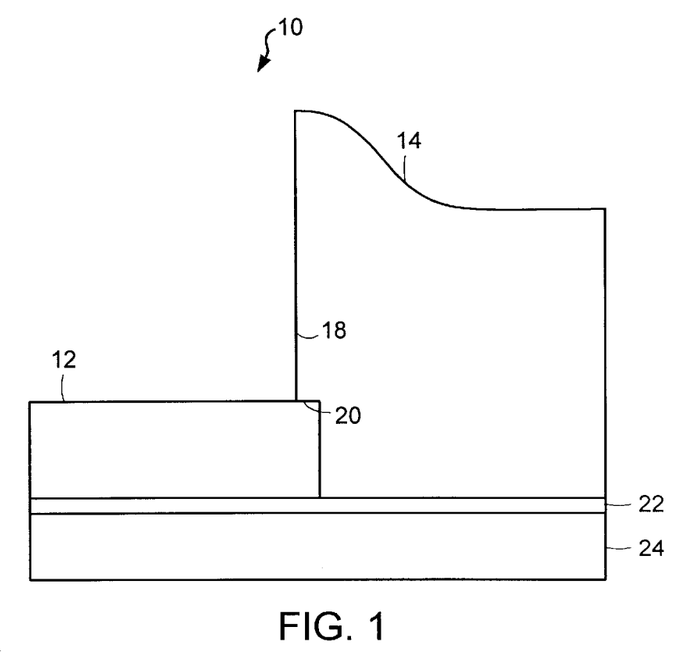
FIG. 1 is an elevation of a biphasic laminated substrate formed in accordance with the teachings of the present invention.

Referring now to FIG. 1, a biphasic laminated substrate 10 is shown. The biphasic substrate 10 includes a nitrocellulose membrane 12 as the capture medium, a release medium 14, and a liner material 24. The nitrocellulose membrane 12 is laminated or coated onto a PET backing material. The release medium 14, the nitrocellulose medium 12, and the liner material 24 are adhesively bonded together to form the biphasic substrate. The nitrocellulose membrane 12, the release medium 14, and the liner 24 are all commercially available products. The adhesive 22 and the liner 24 are ordered prelaminated from Adhesives Research under the description "AR CARE 8192."

Figure 2:
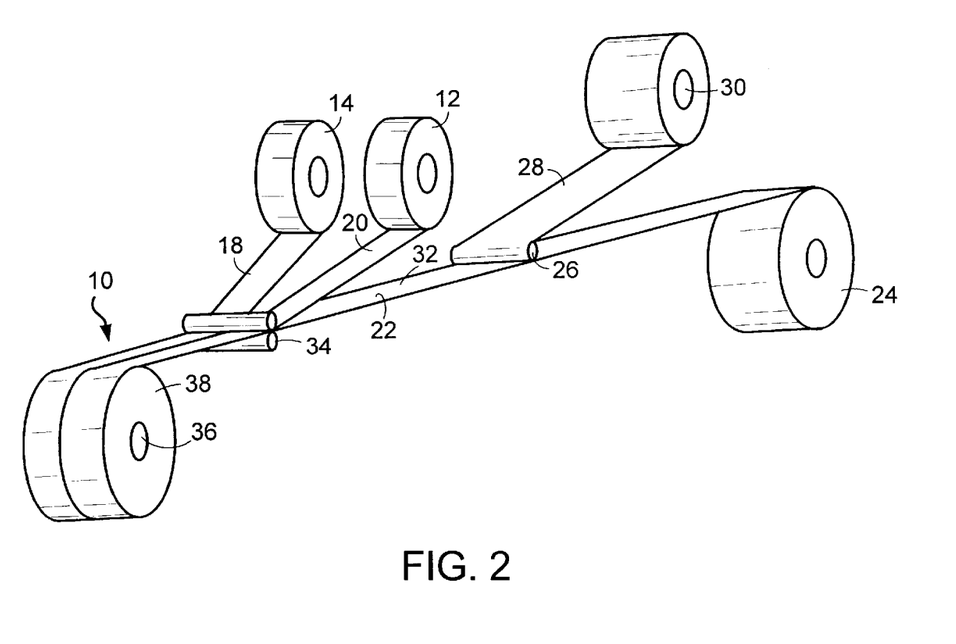
FIG. 2 is an isometric view of the process of forming the laminate of FIG. 1.

Referring now to FIG. 2, the substrate 10 is formed by aligning the release medium 14 and the nitrocellulose membrane 12 such that an edge 18 of the release medium 14 overlaps an edge 20 of the nitrocellulose membrane 12. The liner material 24 is placed in vertical and parallel alignment with the release medium 14 and the nitrocellulose membrane 12. A stripper roller 26 removes a backing material 28 from the liner 24, exposing the adhesive layer 22 coated onto the top surface 32 of the liner 24. The backing material 28 is rewound onto a spindle 30. The release medium 14, the nitrocellulose medium 12, and the liner 24 pass through laminating rollers 34, causing the layers to become bonded together to form the biphasic substrate 10. The biphasic substrate is wound onto spindle 36 and stored in a roll configuration 38 for later use.

The biphasic substrate has a width of approximately 2.1 inches, ±0.016 inches. The release medium 14 has a width of approximately 1.144 inches, ±0.031 inches, with approximately 0.094 inches, ±0.031 inches, overlapping the edge 20 of the nitrocellulose membrane 12.

Figure 3:
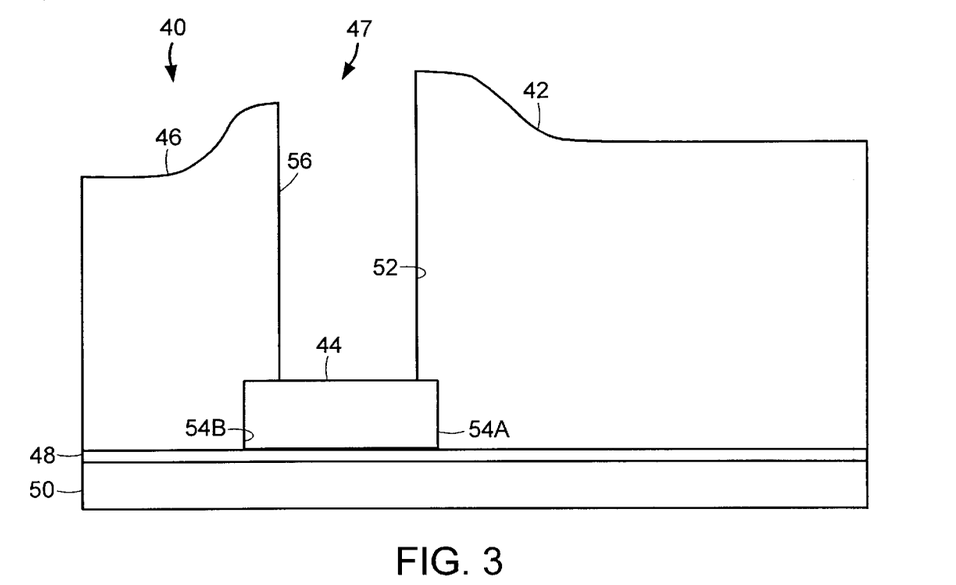
FIG. 3 is an elevation of a multiphasic laminated substrate formed in accordance with the teachings of the present invention.

Referring now to FIG. 3, a multiphasic laminated substrate 40 is shown. The multiphasic substrate 40 includes a release medium 42, a capture medium 44, a sample absorbent medium 46, and a liner 50. As shown, an edge 52 of the release medium 42 slightly overlaps an edge 54a of the capture medium 44. An edge 56 of the sample absorbent layer 46 slightly overlaps an opposite edge 54b of the capture medium 44. This overlapping arrangement between the release medium 42, capture medium 44, and the sample absorbent medium 46 creates a single multimedia layer 47 having a single flow path. An adhesive layer 48 bonds the multimedia layer 47 to the liner 50 to form the multiphasic laminated substrate 40.

Figure 4:
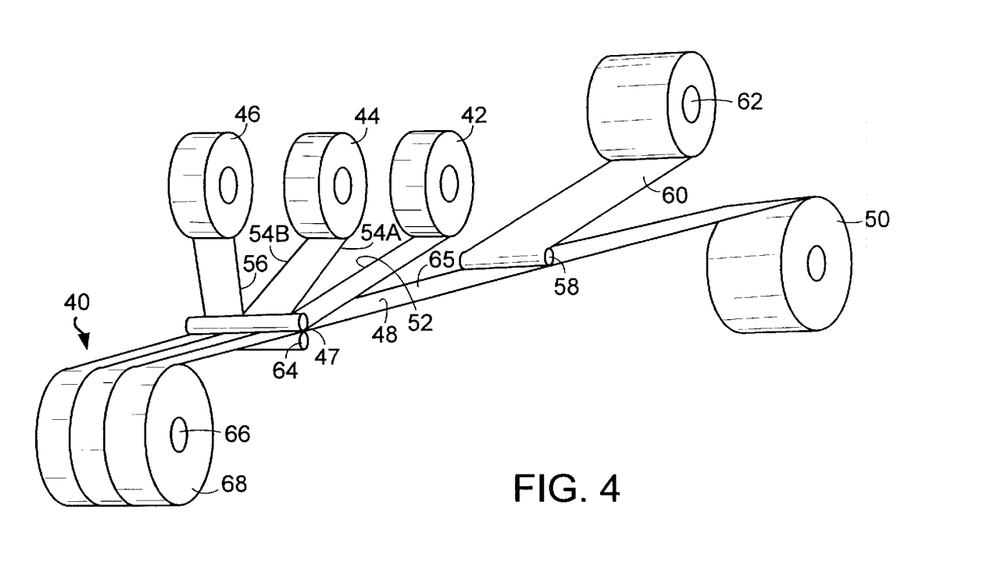
FIG. 4 is an isometric view of the process of forming the laminate of FIG. 3.

As shown in FIG. 4, the multiphasic substrate 40 is formed by aligning the release medium 42 and the capture medium 44 such than an edge 52 of the release medium overlaps an edge 54a of the capture medium 44. An edge 56 of the sample absorbent layer 46 overlaps an opposite edge 54b of the capture medium 44. The overlapping arrangement forms a single multimedia layer 47.

The multiphasic substrate 40 is formed by bonding the multimedia layer 47 and the liner 50 together. The liner 50 is placed in vertical, parallel alignment with the multimedia layer 47. The liner 50 and the multimedia layer 47 are simultaneously advanced through laminating rollers 64. As the liner 50 and multimedia layer 47 pass through the laminating rollers 64, an adhesive 48 bonds the materials together.

The adhesive 48 is exposed by a stripper roller 58 which removes a backing material 60 from the liner 50, exposing the adhesive layer 48 coated onto the top surface 65 of the liner 50. The backing material 60 is rewound onto a spindle 62. The multimedia layer 47 and the liner 50 pass through the laminating rollers 64 and are wound onto spindle 66 and stored in a roll configuration 68 for later use.

The multiphasic substrate 40 has an overall width of approximately 4.071 inches, ±0.016 inches. The release medium has an approximate width of 2.362 inches, ±0.031 inches, with an edge 52 of approximately 0.122 inches, ±0.031 inches, overlapping an edge 54a of the capture medium 44. The sample absorbent medium 46 has a width of approximately 1.000 inches, ±0.031 inches, with an edge 56 of approximately 0.169 inches, ±0.031 inches, overlapping an opposite edge 54b of the capture medium 44. The capture medium 44 has an approximate width of 1.000 inches, ±0.031 inches.

Figure 5:
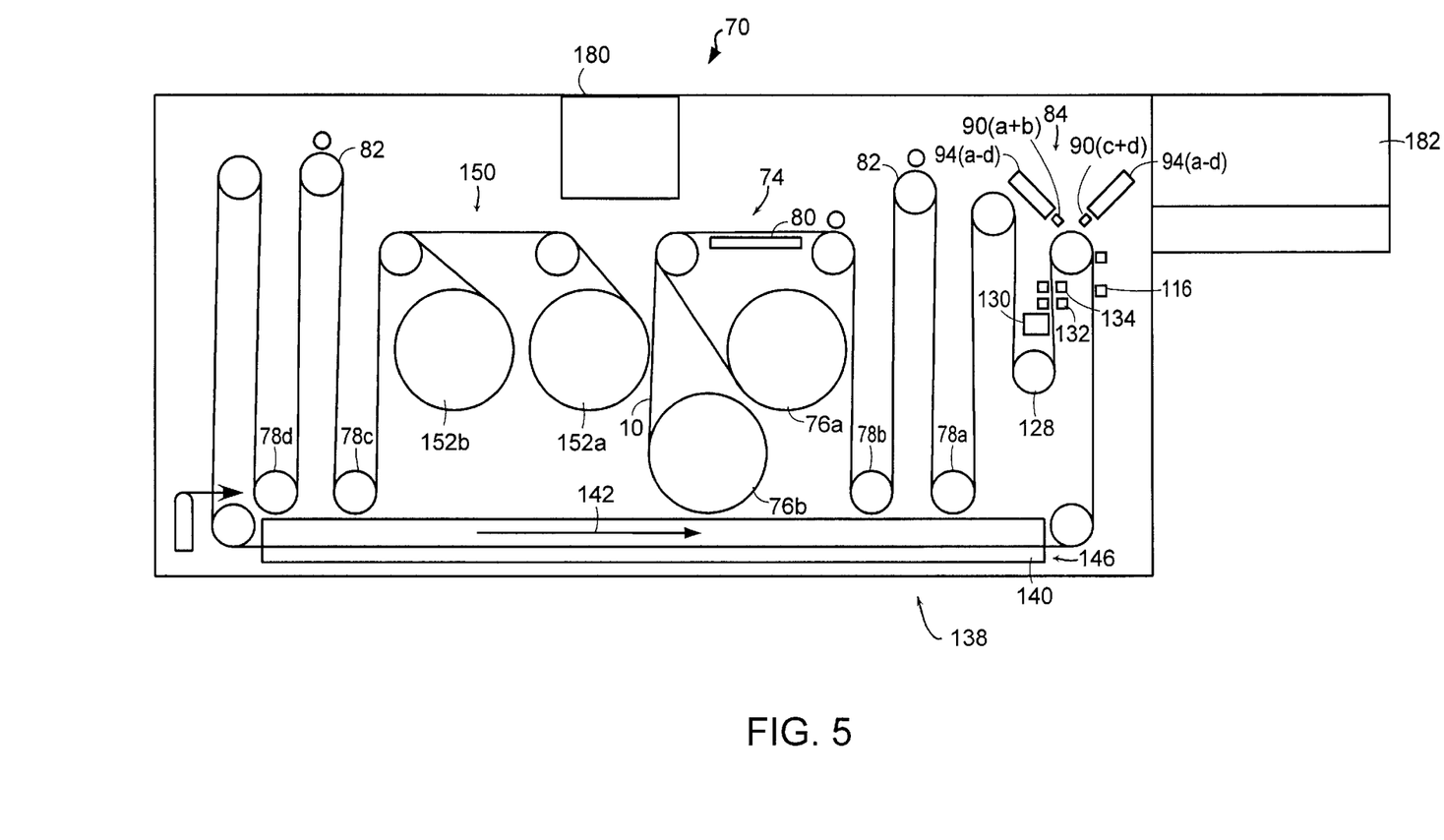
FIG. 5 is a front elevation of a substrate marking machine formed in accordance with the teachings of the present invention.
Figure 6:
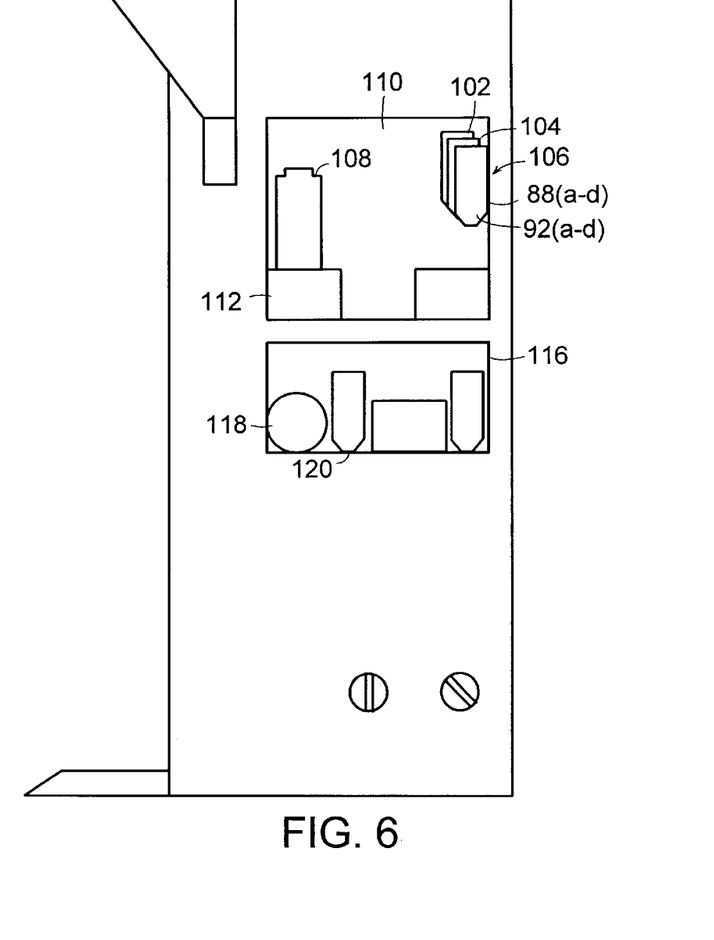
FIG. 6 is an end elevation of the substrate marking machine of FIG. 5 showing the refrigeration chamber and substrate reject marking systems.

The biphasic and multiphasic laminated substrates 10 and 40 are adapted for use as an immunodiagnostic device by a substrate marking machine 70. As shown in FIGS. 5 and 6, the machine 70 includes a leader 72 (not shown), an unwind system 74, a dispensing system 84, a substrate reject marking system 116, a drying system 138, and a rewind system 150. The use of the machine 70 to prepare the substrates 10 and 40 for use as an immunodiagnostic device will be explained with reference to the biphasic laminated substrate 10. One of skill in the art will appreciate that the same process is used to prepare the multiphasic laminated substrate 40.

Referring now to FIG. 5, the leader 72 (not shown) advances the laminated substrate 10 through the machine 70. The leader 72 comprises a paper material spliced to the end of the substrate 10. The leader 72 is threaded through the machine 70, passing through the unwind system 74, intermediate machine 70 sections, and the rewind system 150. Upon activation of the unwind system 74 and the rewind system 150, the leader 72 advances through the machine, causing advancement of the substrate 10.

The unwind system 74 includes unwind spindles 76(a and b), a splice table 80, unwind accumulators 78(a and b), and vacuum drums 82. The unwind spindles 76(a and b) store the unmarked substrate 10 in a roll configuration until ready for processing by the machine 70. The unwind spindles 76(a and b) are mounted on the machine 70 in spatial disposition. This mounting arrangement allows a machine operator to perform on the fly spindle changes and splicing of the substrate 10 without stopping the machine 70. When the machine 70 is in operation, only one unwind spindle 76a or 76b is active at a time. For example, if unwind spindle 76a is active, the substrate 10 stored on unwind spindle 76a is fed through the machine 70. The sensors 75 (not shown) monitor the status of unwind spindle 76a to determine whether it is full or empty. If the sensors 75 detect that the unwind spindle 76a is empty, the machine 70 is stopped automatically. If the sensors 75 detect that the unwind spindle 76a is almost empty, an operator warning system 164 (not shown) is activated, warning the operator to splice the substrate 10 and to activate unwind spindle 76b. The substrate 10 stored on unwind spindle 76b is spliced to the end of the substrate 10 previously unrolled from unwind spindle 76a. The splicing operation is performed at the splice table 80 using red splicing tape. After being unwound from the unwind spindles 76(a or b), the substrate 10 advances to the unwind accumulators 78(a and b).

The unwind accumulators 78(a and b) provide temporary storage for the substrate 10 as it is unwound from the unwind spindles 76(a and b). Storing the substrate 10 in the accumulators 78(a and b) allows a machine operator to perform routine functions such as changing the unwind spindles 76(a and b) without stopping the machine 70. The unwind accumulators 78(a and b) also monitor and control the tension on the substrate 10 as it advances through the machine 70. One of skill in the art will appreciate that the tension on the substrate 10 can be monitored and controlled by separate tension feed controls.

The sensors 77 (not shown) monitor the unwind accumulators 78(a and b) to determine if the unwind accumulators 78(a and b) are full or empty. If the sensors 77 detect that the accumulators 78(a and b) are full, the activated unwind spindle 76(a or b) speed is decreased. If the sensors 77 detect that the unwind accumulators 78(a and b) are empty, the activated unwind spindle 76(a or b) speed is increased.

The unwind system 74 further includes one or more static elimination bars 79 (not shown) which remove electrostatic charge from the substrate 10. The unwind system 74 also includes a drive system 81 (not shown). The drive system 81 includes electric motors which supply power to the unwind spindles 76(a and b).

As the substrate 10 exits the unwind system 74, steering roller 128 guides the substrate 10 to the dispensing system 84. As the substrate 10 advances toward the dispensing system 84, substrate cleaner 130 removes debris and other contaminants from the substrate 10. Substrate guides 132 and vacuum drum 82 maintain the substrate 10 in proper alignment and at appropriate velocity levels as it approaches the dispensing system 84.

Just prior to entering the dispensing system 84, the splice sensors 134 monitor the substrate 10 for the presence of splices. The splice detector 134 uses a fiber optic sensor to look for splices in the substrate, the splices being made with red tape. The splice detector 134 directs a green light on the substrate 10. If the green light encounters the red splicing tape, the detector 134 reads the combination of the red tape and the green light as a dark spot on the substrate 10. Upon detecting the dark spot, the detector 134 signals the machine 70 to raise the reagent dispensing nozzles 90(a–d) and to shut down the dispensing pumps 94(a–d). The machine 70 reactivates the dispensing pumps 94(a–d) and lowers the reagent dispensing nozzles 90(a–d) after the splice passes the reagent dispensing nozzles 90(a–d) by a predetermined distance. After passing through the splice detector 134, the substrate 10 advances to the dispensing system 84.

The machine 70 adjusts the vertical displacement of the reagent dispensing nozzles 90(a–d) using a mechanical system which comprises a roller (not shown) connected to a lever arm (not shown), the lever arm being connected to the reagent dispensing nozzles 90(a–d). The roller maintains contact with the substrate 10. As the substrate 10 passes under the roller, roller position varies up or down depending upon the thickness of the substrate 10 in a given location. As the vertical position of the roller changes, the vertical position of the lever arm changes, causing the vertical position of the reagent dispensing nozzles 90(a–d) to change accordingly. The machine 70 adjusts the height of the reagent dispensing nozzles 90(a–d) from a contact position with a 5 MIL PET up to 0.100 inches above the PET. The reagent dispensing nozzles 90(a–d) maintain a nominal clearance above the substrate of approximately 0.0015 inches.

Referring now to FIGS. 5 and 6, the dispensing system 84 includes reagent reservoirs 88(a–d), reagent dispensing nozzles 90(a–d) and a plurality of reagent dispensing pump systems 94(a–d). The reservoirs 88(a–d) separately store the reagents to be used in the machine 70. Each reservoir 88(a–d) is housed in a refrigerated chamber 110 as shown in FIG. 6. The refrigeration chamber maintains a temperature of approximately 4° C.±2° C.

The reagent dispensing pump systems 94(a–d) deliver reagent from the reservoirs 88(a–d) to the reagent dispensing nozzles 90(a–d). The reagent dispensing pump systems 94(a–d) include two pumps independently connected to each of the reagent reservoirs 88(a–d). The pumps comprising the pumping systems 94(a–d) are positive displacement piston pumps. Other pumps, however, such as rotary vane or centrifugal pumps may be used to deliver the reagent to the reagent dispensing nozzles 90(a–d).

The reagent dispensing system 84 includes one or more sensors 95(a–d) (not shown) placed in the fluid line between the reagent reservoirs 88(a–d) and the reagent dispensing pump systems 94(a–d). The sensors 95(a–d) monitor the fluid entering the pump systems 94(a–d) for bubbles. If the sensors 95(a–d) detect bubbles in the reagent solutions 102, 104, 106, and 108, the machine 70 shuts down. If desired, the machine 70 may be operated with less than all the pump systems in operation.

The reagent reservoirs 88(a–d), the pump systems 94(a–d), and the dispensing nozzles 90(a–d) are connected to form independently operable systems. For example, reagent reservoir 88a is connected to pump system 94a which forces reagent through dispensing nozzle 90a. If all reagent dispensing pump systems and reagent reservoirs except pump system 94a and reservoir 88a are shut off, pump system 94a and reservoir 88a remain completely operable.

The reagents used in the dispensing system 84 include a goat antimouse IgG solution 102, a streptavidin solution 104, a biotin solution 106, and a gold solution 108. The goat antimouse IgG solution 102 comprises a water based buffer solution with a density and viscosity near that of water. The streptavidin solution 104 comprises a water based buffer with a density and viscosity near that of water. The biotin solution 106 comprises approximately 28% Maltrin and 1% Tris buffer. The gold solution 108 comprises approximately 40% Maltrin, 5% BSA, and 0.7% Tris buffer. The gold solution 108 is magnetically stirred by magnetic stirrer 112 to prevent settling of the gold particles.

The reagent dispensing system 84 applies the reagent solutions 102, 104, 106, and 108 in various quantities to the substrate 10. The reagent dispensing system 84 dispenses the goat antimouse IgG 102 and the streptavidin 104 over a range of ¼ $\mu$l to 4 $\mu$l per centimeter, the biotin solution 106 over a range of ⅛ $\mu$l to 2 $\mu$l per centimeter, and the gold solution 108 over a range of ¾ $\mu$l to 12 $\mu$l per centimeter. The reagent dispensing system 84 dispenses each reagent solution with an accuracy of ±1% of a selected rate, the selected rate being 2 $\mu$l/cm for the gold solution 108, 0.75 $\mu$l/cm for the biotin solution 106, and 0.5 $\mu$l/cm for both the streptavidin solution 104 and the goat antimouse IgG solution 102.

Figure 7:
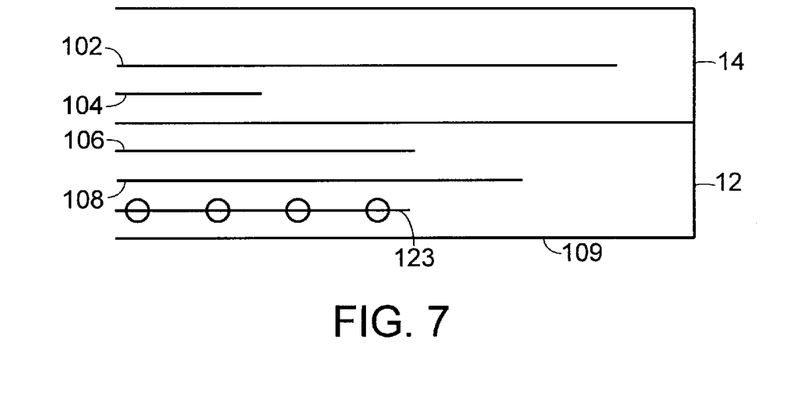
FIG. 7 is a plan view of the biphasic laminate of FIG. 1 after being marked with reagent.

As shown in FIG. 7, the reagent dispensing system 84 applies the reagent solutions 102, 104, 106, and 108 to the substrate 10 at predetermined locations. For example, reagent dispensing nozzle 90a applies the colloidal gold solution 108 to the release medium 14 at approximately 0.595 inches, ±0.015 inches, measured from the edge 109, the edge farthest from the machine face side of the machine 70. Dispensing nozzle 90b applies the biotin solution 106 to the release medium 14 at approximately 0.795 inches, ±0.015 inches, from the edge 109. The reagent dispensing nozzles 90c and 90d apply the streptavidin solution 104 and the goat antimouse IgG solution 102, respectively, to the nitrocellulose medium 12 at approximately 1.405 inches and 1.605 inches, ±0.015 inches, from the edge 109.

The reagent dispensing system 84 delivers reagent 102, 104, 106, and 108 to the substrate 10 at substrate 10 speeds ranging from 150 to 325 centimeters per minute. The reagent dispensing system 84 is designed to allow an operator to perform off-line calibrations (weight checks) of the dispensing system 84. After the substrate 10 is marked with the reagents 102, 104, 106, and 108, the substrate 10 passes through the substrate reject marking system 116.

Referring now to FIGS. 6, the primary function of the substrate reject marking system 116 is to monitor the reagent markings 102, 104, 106, and 108 and the substrate 10 itself for discontinuities. The substrate reject marking system 116 includes a reservoir 120, a reject marking pump 118, and a dispensing nozzle 121 (not shown). The reservoir 120 stores the reject marking solution 123 which comprises, but is not limited to, a mixture of red and blue food coloring, Proclin 300, and water. The reagent marking pump 118 takes the substrate reject marking solution 123 from the reservoir 120 and delivers it to the reject marking dispensing nozzle 121. The dispensing nozzle 121 applies the marking solution 123 to the substrate as spots spaced ½ inch apart or as a continuous line. As shown in FIG. 7, the reject markings are located on substrate 10 at approximately 1.8 inches, ±0.015 inches, from the edge opposite edge 109.

To monitor the continuity of the reagent markings and the substrate 10, the reject marking system 116 uses one or more sensors. The sensors detect noncontinuous portions of the reagent markings 102, 104, 106, and 108 and noncontinuous portions of the substrate 10 formed by splices. The sensors comprise a vision system 174 (not shown). The vision system 174 directs light onto the substrate 10 and uses the reflection of the light beam to determine the presence or absence of reagent markings 102, 104, 106, and 108 on the substrate 10. The vision system 174 activates the substrate reject marking system 116 when gaps or discontinuous portions are detected in the reagent markings 102, 104, 106, and 108.

The vision system 174 uses a "gray scale" to detect reagent markings 102, 104, 106, and 108 on the substrate. Using the gray scale, the vision system 174 looks for the edge of the reagent markings 102, 104, 106, and 108. If the vision system is used to detect splices in the substrate, the system is configured to look for a dark spot on the substrate in the manner previously described. One of skill in the art will appreciate that other sensor devices such as a linear scanner may be used to accomplish the function of the vision system 174.

After leaving the substrate reject marking system 116, the substrate 10 enters the drying system 138. The drying system 138 includes a dryer chamber 140, a fan (not shown), and a filter 144 (not shown). The fan is located in the drying chamber 140, and it blows air onto the substrate 10 in the direction shown generally by arrow 142 opposite the travel of the substrate 10 through the dryer chamber 140. The filter 144 removes contaminants from the air before the fan blows it onto the substrate 10. The drying chamber 140 temperature can range between 50° C. and 100° C. Typically, a temperature of 70° C. is used when the machine is operating at nominal pump and substrate speeds. The drying chamber 140 temperature is set in a plenum 146 which immediately precedes the entrance to the drying chamber 140. The drying system 138 controls temperature settings in one degree increments, and it holds the temperature within ±2° C. of the set point.

The drying system 138 also includes one or more sensors 148 (not shown) for monitoring drying system 138 temperature. The sensors 148 cause the machine 70 to stop and the activation of an operator warning system 164 if the sensors 148 detect a drying system 138 temperature outside a predetermined range. The sensors 148 monitor and detect temperature variations with an accuracy of ±1° F. The dryer system 138 also includes one or more sensors 150 (not shown) for monitoring the air flow of the drying system 138. The sensors 150 cause the machine 70 to shut down and the activation of the operator warning system 164 if the sensors 150 detect air flow parameters outside a predetermined range. After the reagent marked substrate 10 exits the dryer chamber 140, it is either stored in rewind accumulators 78(c and d) or advanced to the rewind system 150.

The rewind accumulators 78(c and d) serve as temporary storage units for the substrate 10 before it advances to the rewind spindles 152(a or b). In the embodiment of the invention shown in FIG. 5, the rewind accumulators also monitor and control the tension on the substrate 10. One of skill in the art will appreciate that a separate element may be used to control and monitor tension on the substrate 10. Once the substrate 10 exits the rewind accumulators 78(c and d) it advances to the rewind system 150.

The rewind system 150 includes one or more rewind spindles 152(a and b) spatially displaced from one another. The rewind spindles 152(a and b) are mounted on the machine 70 to permit on the fly spindle change without stopping the machine 70. Only one rewind spindle 152(a or b) is active at a time. Once the spindle 152a becomes full, the operator activates the second spindle 152b. The rewind spindles 152(a and b) store the reagent marked substrate 10 in a roll configuration 38 for later use. The rewind spindles 152(a and b) are powered by electric motors 160 (not shown).

The rewind system 150 also includes one or more sensors 161 (not shown) which detect whether the level of the substrate 10 at the rewind accumulators 78(c and d) is high or low. The sensors cause the rewind spindles 152(a or b) to speed up if the substrate 10 level at the rewind accumulators 78(c and d) is low. Likewise, the sensors 161 cause the rewind spindles 152(a and b) to slow down if the substrate 10 level at the rewind accumulators 78(c and d) is high. Additionally, the sensors 161 detect if the rewind accumulators 78(c and d) are full or empty. If the sensors 161 detect that the accumulators 78(c and d) are full or empty, the machine 70 stops automatically. The rewind system 150 further includes one or more sensors 162 (not shown) for determining whether the rewind spindles 152(a and b) are full or empty. Upon detecting a full reading, the sensors 162 cause the activation of the operator warning system 164.

The machine 70 also includes one or more sensors 166 (not shown) for measuring and reporting substrate 10 roll length at the rewind spindles 152(a and b). Depending on the type of laminated substrate being run on the machine, the maximum roll length may be 350 feet and the maximum roll diameter may be 17 inches. The sensors 166 measure the roll length with an accuracy of ±0.1 feet. The maximum roll length is dependent on the material used to form the substrate and may vary up or down depending on the material used.

The machine 70 includes sensors 176 (not shown) for detecting substrate 10 speeds. Substrate 10 advancement stops and the operator alert system 164 is activated if substrate 10 speeds fall outside preset limits. The sensors 176 measure and report substrate 10 speeds with an accuracy of ±0.01 feet per minute. Substrate 10 speeds can range from 90 to 450 centimeters per minute. One of skill in the art will appreciate that the machine 70 may be adapted to permit substrate 10 speeds outside the given range.

In addition to the features described above, the machine 70 directs the outputs from its various sensors into a computer 170 (not shown). The computer 170 processes the inputs from the sensors and causes the activation of the operator warning system 164 if the processed signals indicate that an identified operating parameter tends toward a predefined control limit. The computer 170 will cause the machine 70 to automatically shut down if operating parameters actually cross preprogrammed machine 70 control limits.

The computer 170 also processes and displays the data from various sensors to provide the machine 70 operator with statistical process control information concerning the machine's 70 operating parameters. The computer 170 shows real time displays of parameter history, including target and control limits. The machine 70 also includes a printer 172 (not shown) for recording and displaying sensor outputs processed by the computer 170. One of skill in the art will appreciate that sensor outputs can be displayed and recorded by other similar devices.

The computer 170 also is connected to control panels 180 and 182 which control machine operating parameters such as substrate speed, dryer temperature, reagent dispensing rate, pump rate, pump filling rate, total pump displacement, substrate jog, dispense tip vertical position, and miscellaneous general machine operations. Again, the computer 170 controls machine operating parameters by processing input signals from various machine 70 sensors. The computer 170 manipulates the signals received from the sensors and outputs the appropriate signal and/or function command to the control panels 180 and 182. One of skill in the art will appreciate that many types of sensors may be used to monitor and control each of the control parameters.

The inventions described herein define biphasic and multiphasic laminated substrates which are marked with reagent solutions by a substrate marking machine. The substrate marking machine automatically applies four different reagents to the biphasic or multiphasic laminated substrates to prepare them for use as an immunoassay. The machine rolls the reagent marked substrates onto a spindle where they are stored until ready for use.

While the inventions have been described with reference to specific examples, it will be understood that various modifications and alterations will occur to those skilled in the art from the foregoing detailed description and the accompanying drawings. These modifications and alterations are intended to fall within the scope of the claims.

What is claimed is:

1. A process of preparing a biphasic laminated substrate for use in an immunodiagnostic test device, the process comprises the steps of:

providing a liner material, a release medium, and a capture medium, wherein the capture medium comprises a micorporous hydrophilic polymeric material disposed on a polymer film;

aligning the release medium with the capture medium in side-by-side, single edge only, overlapping relation to form a single release/capture media layer such that a sequential liquid flow path is formed therethrough;

aligning the liner material in vertical, parallel alignment with the release/capture media layer; and bonding the liner material to a side of the release/capture media layer including the polymer film to form a laminate.

2. The process of claim 1 further comprising the steps of:

applying one or more reagents to predetermined locations on the release/capture media layer; and drying the reagent marked laminate.

3. The process of claim 2 wherein each of the one or more reagents is applied by respective one or more dispensing nozzles, each independently connected to a dedicated reservoir containing a quantity of reagent, each reservoir being independently connected to a separate reagent dispensing pump for delivering a quantity of reagent to each nozzle.

4. The process of claim 2 further comprising the steps of:

detecting discontinuous portions of reagent on the release/capture media layer; and marking the laminate at the discontinuous portions.

5. A process of preparing a multiphasic laminated substrate for use in an immunodiagnostic test device, the process comprising the steps of:

providing a liner material, a release medium, a sample absorbent medium, and a capture medium, wherein the capture medium comprises a microporous hydrophilic polymeric material disposed on a polymer film;

aligning the release medium with the capture medium in side-by-side, single edge only, overlapping relation;

aligning the sample absorbent medium with an opposite edge of the capture medium in side-by-side, single edge only, overlapping relation, forming a single multimedia layer having a sequential flow path therein, the multimedia layer including the release, capture, and aligning the liner material in vertical, parallel alignment with the multimedia layer; and bonding the liner material to a side of the multimedia layer including the polymer film to form a laminate.

6. The process of claim 5 further comprising the steps of:

applying one or more reagents to predetermined locations on the multimedia layer; and drying the reagent marked laminate.

7. The process of claim 6 wherein each of the one or more reagents is applied by respective one or more dispensing nozzles, each independently connected to a dedicated reservoir containing a quantity of reagent, each reservoir being independently connected to a separate reagent dispensing pump for delivering a quantity of reagent to each nozzle.

8. The process of claim 6 further comprising the steps of:

detecting discontinuous portions of reagent on the multimedia layer; and marking the laminate at the discontinuous portions.

* * * * *

UNITED STATES PATENT AND TRADEMARK OFFICE
CERTIFICATE OF CORRECTION

PATENT NO.  : 5,846,835
DATED       : December 8, 1998
INVENTOR(S) : Sisbarro et al.

It is certified that error appears in the above-identified patent and that said Letters Patent is hereby corrected as shown below:

In claim 1, column 14, line 39, delete the word "micorporous" and replace with -- microporous --.

In claim 5, column 15, line 12, after the text "capture, and" insert -- sample absorbent media; --.

Signed and Sealed this

Twenty-third Day of March, 1999

*Attest:*

Q. TODD DICKINSON

*Attesting Officer*         *Acting Commissioner of Patents and Trademarks*